Patented July 24, 1951

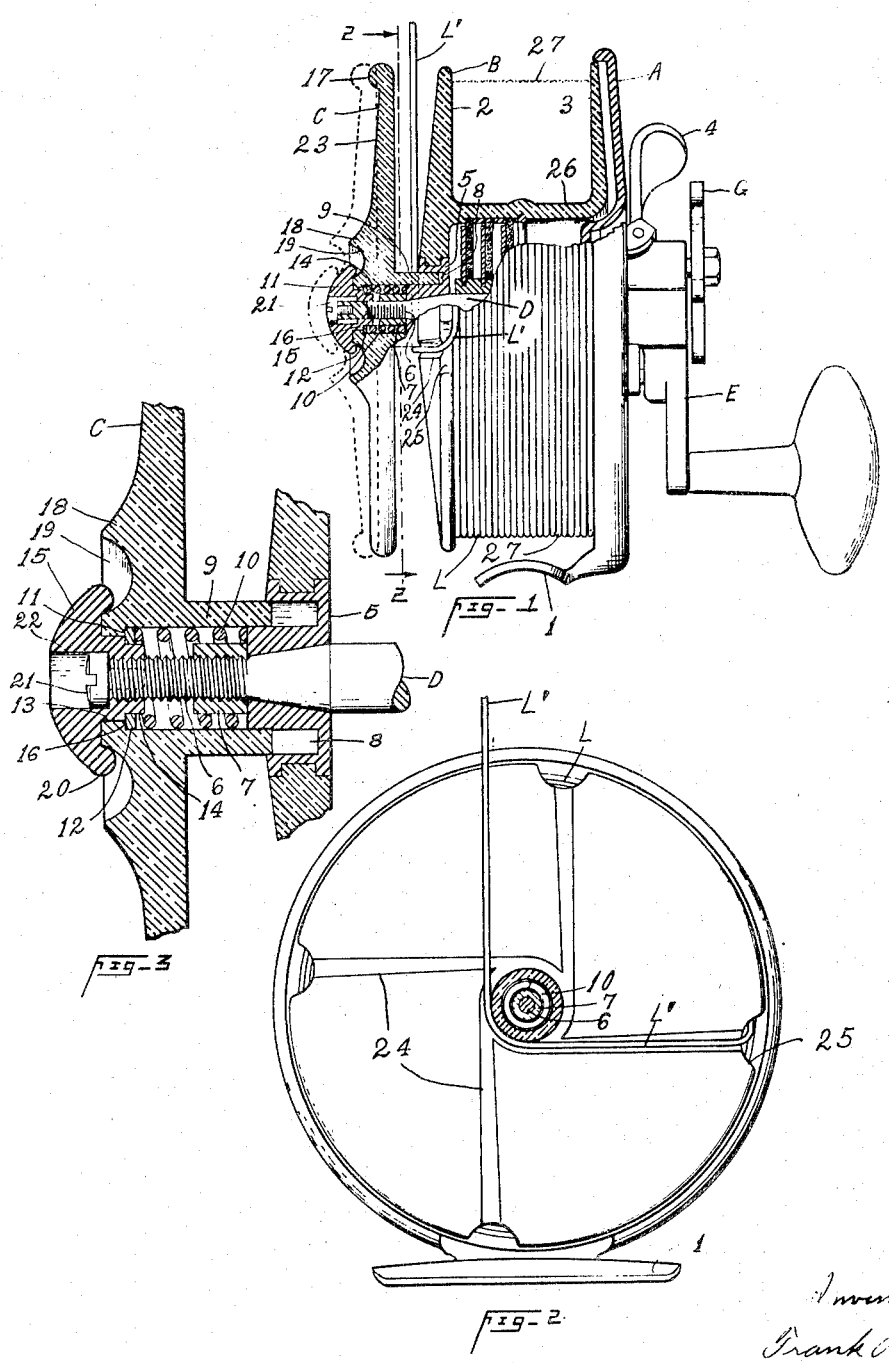

2,561,801

UNITED STATES PATENT OFFICE 2,561,801

CASTING REEL

Frank A. King, deceased, late of Los Angeles, Calif., by A. W. Tedstrom, Parsons, Kans., and Ernest Lynn King and William Scott King, both of Los Angeles, Calif., administrators Substituted for abandoned application Serial No. 553,129, September 6, 1944. This application April 2, 1948, Serial No. 18,658

3 Claims. (Cl. 242—118)

This invention relates to fishing reels and more particularly to casting reels which are designed to prevent excessive pay out of the line during the casting operation; this application being in substitution of an abandoned application, Serial Number 553,129, filed September 6, 1944.

In bait casting with the conventional reel, the rod and bait are given a forceful radial swing by the operator, which pays out the bait and its line thus imparting the initial rotational spin to the free running spool, at which time the speed of the spool's peripheral line-winding and its connected bait are traveling momentarily equal, however, for obvious reasons the peripheral spool winding speed soon exceeds that of the bait which necessarily dimishes roughly by the square of the distance the bait can be cast, the result of which condition is an excessive pay out of line and the well known line snarl therein.

The primary object of the present invention resides in the provision of means to retard excessive pay out of line and yet permit the spool to freely rotate throughout the casting operation at its initial rate of speed.

A most important object of this invention is that of a new design of retarding ratio anti-backlash casting spool, including an axially adjustable outer auxiliary end flange that is adapted for free rotational movement with respect to the main winding portion of the spool.

A meritorious object of the present invention is a reel structure that is free from nonessential parts such as the conventional frame and tail plate; these parts tend to interfere with the proper care and manipulation of the line in the casting operation.

This type of spool design affords the advantages of a V-shaped casting space that is relatively deep and narrow at its bottom with respect to its diameter, and is adapted to be adjusted to contain only that portion of line that is to be cast therefrom. As the line is drawn from the casting space by the medium of the bait, obviously each consecutive laminated circumference of line taken from the peripheral winding thereof is comparatively less in length than the preceding one, consequently excessive line pay out is eliminated and controlled by a predetermined axial adjustment of the V-shaped casting space.

Still another object is the provision of means for self-locking the flange adjusting means in a predetermined position.

In the accompanying drawing, there is shown for purpose of illustration one embodiment which this invention may assume in practice when embodied in a retarding ratio anti-back-lash spool.

In the drawing:

Fig. 1 is a rear elevation of a reel equipped with the improved spool hereof, certain parts being broken away to show other parts in central cross section.

Fig. 2 is a section on line 2—2 of Figure 1.

Fig. 3 is an enlarged fragmentary sectional view of the flange self-locking adjusting device.

As disclosed in the drawing, the reel comprises a recessed head plate A having an integral reel seat 1, by which the reel is attached to the rod.

A spool B comprises an adjustable end flange C and two integral flanges 2 and 3, the latter of which provide the main winding spool which is journaled in the plate A by means of a spool spindle D. The spool is driven in the line winding-in direction by the crank E, reverse rotation of the crank E being prevented by the usual ratchet and pawl means not shown.

The spool B is adapted for free spool action by means of a combined clutch and drag unit F which is controlled by the lever 4 and a pilot wheel G.

Further description of the cranking mechanism is not disclosed in this application, as it forms no part of this invention.

Spool B is produced from Bakelite, or other suitable material, and in this instance a flanged hub 5 is centrally moulded in the outer end of spool B. Hub 5 is provided with a central tapered bore which is mounted on a correspondingly tapered outer end of spindle D and fixed thereto by means of an extended screw-threaded end 6 and a nut 7, threaded thereon.

It will be seen that hub 5 includes an annular deep channeled recess 8 which journals a shank sleeve 9, integrally formed with said flange C, the inner diameter of which sleeve is slightly larger and substantially longer than the hub 5, thus providing a cylindrical chamber which houses a compression lock spring 10 that is assembled over the nut 7 against the hub 5.

The outer inner diameter of sleeve 9 is reduced to form a stop shoulder 11 for a thrust washer 12 and a short annular bearing surface 13, rotatable on a trunnion 14 of an adjusting nut 15, threaded on the outer end of screw 6 for axially adjusting the flange C. The trunnion 14 is also provided with a shoulder 16 which co-operates with shoulder 11 and washer 12 to compress the spring 10 in assembly, thus locking the nut 15 in its adjusted position.

This auxiliary flange C is formed with a beaded-like peripheral protection rim 17 and a flared annular line shield 18, adjacent to and concentric with the cap nut 15, thus forming an inwardly curved recess 19 therebetween, which serves as finger clearance in making adjustments of the nut 15 which is provided with a knurled periphery as at 20 for this purpose, but not shown. The outer marginal end of screw 6 is centrally drilled and threaded, wherein is turned a fillister headed stop screw 21 over which a counterbore 22 of nut 15 slides when making adjustments thereof, the depth limit of this bore being equal to the axial movement of flange C, as indicated by the dotted line 23.

As seen in Fig. 2, the outer face of flange 2 is formed with radial line-receiving grooves 24 connecting with a series of arcuate openings 25 in its periphery. The line L is attached to the spool core 26, in the conventional manner, between flanges 2 and 3 which comprise the main winding spool space 27.

In operation; the customary manner of holding the reel is to grasp the rod and reel with a portion of the left palm resting on the outer flange C, which is then permitted to remain stationary as the main winding spool is rotated for winding in the line, thus facilitating the left hand in thumbing the line to guide the same in the main winding space 27.

When it is desired to make a cast, a selected length of casting line equal to the casting ability of the operator is passed through one of the openings 25 to the V-space where the line L' is wound in, thus completely filling the V-space with line, which tends to rotate the flange C as a unitary part thereof during the casting operation.

In this particular instance, lever 4 functions through the clutch unit F to provide free spool position for casting the line L', however, other exigencies may be employed for this purpose.

From the foregoing, it should be clearly understood that each consecutive series of line winding payed out from the V-space will progressively diminish in length as the spool continues to rotate at its initial rate.

Obviously, in the casting operation the auxiliary spool progressively pays out less line per each revolution thereof, due to each winding per revolution containing less line and the V-space is so adjusted that its minimum core limit occurs approximately at the time the casted bait reaches its destination. It should be observed that the component tapering V-shape of the auxiliary spool, by virtue of its diminishing width, controls line pay out as it progresses toward its minimum core. Therefore, the width of the auxiliary spool is varied by means of the nut 15, so that the line pay out velocity will equal and cooperate with the initial spool velocity, thus eliminating back-lash.

It should be noted that in having the spool flange C constructed and arranged as here provided, elimination of the standard reel frame structure is made possible with the result that the auxiliary spool is free, and unobstructed circumferentially to facilitate free running of the line and easier access to the adjusting means which latter is on the outer side of the flange. Moreover the reel is lighter as to weight, consists of fewer parts and subject to cheaper production by reason of the elimination of the standard side plates and cross bars as heretofore used in the standard reel frame. An additional advantage in having the "free" end flange of the auxiliary spool adjustable as here provided is that it may be readily adjusted without changing the capacity of or altering the main spool.

While there is here shown and described a specific embodiment of this invention the invention is not limited to the exact details of construction set forth, and embraces such changes, modifications and equivalents of the parts and their formation and arrangement as come within the purviews of the appended claims.

What is claimed is:

1. In a fishing reel, a main spool on which the major portion of a fishing line is wound having relatively fixed integral end flanges, an adjustable end flange, a sleeve on the adjustable flange supported on the spool with the adjustable flange in outwardly spaced relation to one end flange of the spool for forming therewith a winding space for a minor casting length of said line, and adjusting means operable on the other side of said end flange by which the end flange is moved toward and away from said one end flange of the main spool for varying the width of said last mentioned space.

2. The invention as set forth in claim 1, wherein the said adjustable end flange and said main spool are subject to relative rotation.

3. In a fishing reel, a main spool on which the major portion of a fishing line is to be wound having relatively fixed integral end flanges, an adjustable end flange disposed in outwardly spaced relation to one of the end flanges of the main spool, a slidable connection between said adjustable end flange and the adjacent fixed spool end flange including a sleeve on said adjustable end flange supported on said spool, said adjacent flanges forming an auxiliary spool for reception of a minor casting length of said line therein, and an adjusting means affording axial adjustment of said end flange for varying the width of the winding space between said end flange and said end flange of said main spool wherein said adjusting means includes a screw-threaded member projecting from said end of said spool into said sleeve and relative to which said adjustable end flange is axially moveable, a nut arranged on said screw-threaded member so that when turned thereon the adjustable end flange will be axially adjusted, and a spring yieldingly abutting said nut to hold it against unintentional turning.

A. W. TEDSTROM,
ERNEST LYNN KING,
WILLIAM SCOTT KING,
*Administrators of the Estate of Frank A. King, Deceased.*

REFERENCES CITED

The following references are of record in the file of this patent:

UNITED STATES PATENTS

| Number | Name | Date |
|---|---|---|
| 2,347,173 | Coxe et al. | Apr. 25, 1944 |
| 2,363,533 | King | Nov. 28, 1944 |
| 2,409,154 | Schafer | Oct. 8, 1946 |